(12) United States Patent
Kumazawa

(10) Patent No.: US 11,873,056 B2
(45) Date of Patent: Jan. 16, 2024

(54) THROTTLE GRIP DEVICE

(71) Applicant: ASAHI DENSO CO., LTD., Shizuoka (JP)

(72) Inventor: Takeo Kumazawa, Shizuoka (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 0 days.

(21) Appl. No.: 17/932,716

(22) Filed: Sep. 16, 2022

(65) Prior Publication Data

US 2023/0095699 A1 Mar. 30, 2023

(30) Foreign Application Priority Data

Sep. 17, 2021 (JP) ................................. 2021-152436

(51) Int. Cl.
*B62K 23/02* (2006.01)
*B62K 23/04* (2006.01)

(52) U.S. Cl.
CPC .................................... *B62K 23/04* (2013.01)

(58) Field of Classification Search
CPC ......... B62K 23/02; B62K 23/04; F02D 11/02; F02D 11/106; F02D 2011/101; F02B 61/02

See application file for complete search history.

(56) References Cited

U.S. PATENT DOCUMENTS

| | | | | |
|---|---|---|---|---|
| 5,241,877 A * | 9/1993 | Chen | ...................... | B62K 23/04 74/489 |
| 10,377,441 B2 * | 8/2019 | Oshiro | ...................... | F02B 61/02 |
| 10,850,795 B2 * | 12/2020 | Oshiro | ...................... | F02D 11/02 |
| 10,953,947 B2 * | 3/2021 | Kaida | ..................... | B62K 11/14 |
| 2003/0121763 A1 * | 7/2003 | Mengoli | .................. | G05G 1/10 200/61.85 |
| 2004/0216550 A1 * | 11/2004 | Fallak | .................... | B62M 25/08 74/551.9 |
| 2005/0251301 A1 * | 11/2005 | Suzuki | .................. | B62K 23/04 701/23 |

FOREIGN PATENT DOCUMENTS

| | | |
|---|---|---|
| CN | 112124484 A | * 12/2020 |
| EP | 2 011 728 A1 | 1/2009 |

(Continued)

OTHER PUBLICATIONS

Extended European Search Report dated Feb. 9, 2023 issued in Patent Application No. 22 19 6140.

*Primary Examiner* — Adam D Rogers
(74) *Attorney, Agent, or Firm* — Pearne & Gordon LLP

(57) ABSTRACT

A throttle grip device controls an engine of a vehicle in accordance with a rotation angle of a throttle grip detected by a rotation angle detection unit, a base end portion of the throttle grip has a first flange region portion and a second flange region portion formed over a predetermined range in a circumferential direction, the first flange region portion and the second flange region portion are respectively formed at positions offset by a predetermined dimension with respect to an axial direction of the throttle grip, and the first support portion and the second support portion are formed so as to protrude at positions corresponding to the first flange region portion and the second flange region portion, respectively.

4 Claims, 12 Drawing Sheets

(56) References Cited

FOREIGN PATENT DOCUMENTS

| EP | 2 644 491 A1 | | 10/2013 | |
|----|----|----|----|----|
| EP | 2 716 891 A1 | | 4/2014 | |
| JP | 2003208831 A | * | 7/2003 | |
| JP | 2011144715 A | * | 7/2011 | |
| JP | 2012116423 A | * | 6/2012 | |
| JP | 2015081564 A | * | 4/2015 | |
| JP | 2017-133449 A | | 8/2017 | |
| JP | 2020122405 A | * | 8/2020 | ............. B62K 23/04 |
| JP | 2020122406 A | * | 8/2020 | |
| JP | 2020122476 A | * | 8/2020 | ............. B62K 23/04 |
| JP | 2020-196388 A | | 12/2020 | |
| WO | WO-2013146158 A1 | * | 10/2013 | ............. B62K 23/04 |

\* cited by examiner

THROTTLE GRIP DEVICE

CROSS-REFERENCE TO RELATED APPLICATIONS

The present application claims the benefit of priority of Japanese Patent Application No. 2021-152436, filed on Sep. 17, 2021, the content of which is incorporated herein by reference.

TECHNICAL FIELD

The present invention relates to a throttle grip device for throttle grip rotation-based vehicle engine control.

BACKGROUND ART

Nowadays, many two-wheeled vehicles are configured such that the rotation angle of a throttle grip is detected by a throttle opening degree sensor and the detected value is sent as an electric signal to, for example, an electronic control device for use in two-wheeled vehicles.

The electronic control device performs a predetermined calculation based on such a detection signal. Engine ignition timing control and intake or throttle valve opening and closing control are performed based on the result of the calculation.

For example, according to JP-A-2020-196388, there are provided an interlocking member engaging and interlocking with a throttle grip, a magnetic sensor detecting the rotation angle of the throttle grip by detecting the rotation angle of the interlocking member, and first and second case members formed with openings through which the base end portion of the throttle grip is inserted and accommodating the interlocking member and a rotation angle detection unit and vehicle engine control can be performed in accordance with the rotation angle of the throttle grip detected by the rotation angle detection unit.

However, in the throttle grip device of the related art described above, the base end portion of the throttle grip is circumferentially and axially symmetrical, and thus assembly to the openings of the first and second case members may be performed in a wrong direction. In particular, in a case where stopper portions for throttle grip rotation range regulation are formed in the opening edge portions of the first and second case members, there is a problem that the rotation range of the throttle grip cannot be regulated at the correct position with the throttle grip assembled in a wrong direction to the openings of the first and second case members.

SUMMARY

The present invention is made in view of such circumstances, and an object of the present invention is to provide a throttle grip device in which the base end portion of a throttle grip can be easily assembled in a set regular orientation with respect to openings of first and second case members.

According to an aspect of the present invention, there is provided a throttle grip device including: a throttle grip attached to a handlebar of a vehicle and capable of a rotation operation by a driver; an interlocking member having an engaged portion engageable with an engaging portion formed on the throttle grip and rotatable in conjunction with the throttle grip; a rotation angle detection unit capable of detecting a rotation angle of the throttle grip by detecting a rotation angle of the interlocking member; a first case member and a second case member formed with openings through which a base end portion of the throttle grip is inserted and accommodating the interlocking member and the rotation angle detection unit; and a first support portion and a second support portion formed so as to protrude on the first case member and the second case member, respectively, having protruding ends abutting against an outer peripheral surface of the handlebar to support the first case member and the second case member, and positioned so as to face the base end portion of the throttle grip, the throttle grip device being capable of controlling an engine of the vehicle in accordance with the rotation angle of the throttle grip detected by the rotation angle detection unit, where the base end portion of the throttle grip has a first flange region portion and a second flange region portion formed over a predetermined range in a circumferential direction, the first flange region portion and the second flange region portion are respectively formed at positions offset by a predetermined dimension with respect to an axial direction of the throttle grip, and the first support portion and the second support portion are formed so as to protrude at positions corresponding to the first flange region portion and the second flange region portion, respectively.

DESCRIPTION OF EMBODIMENTS

Figure 1:
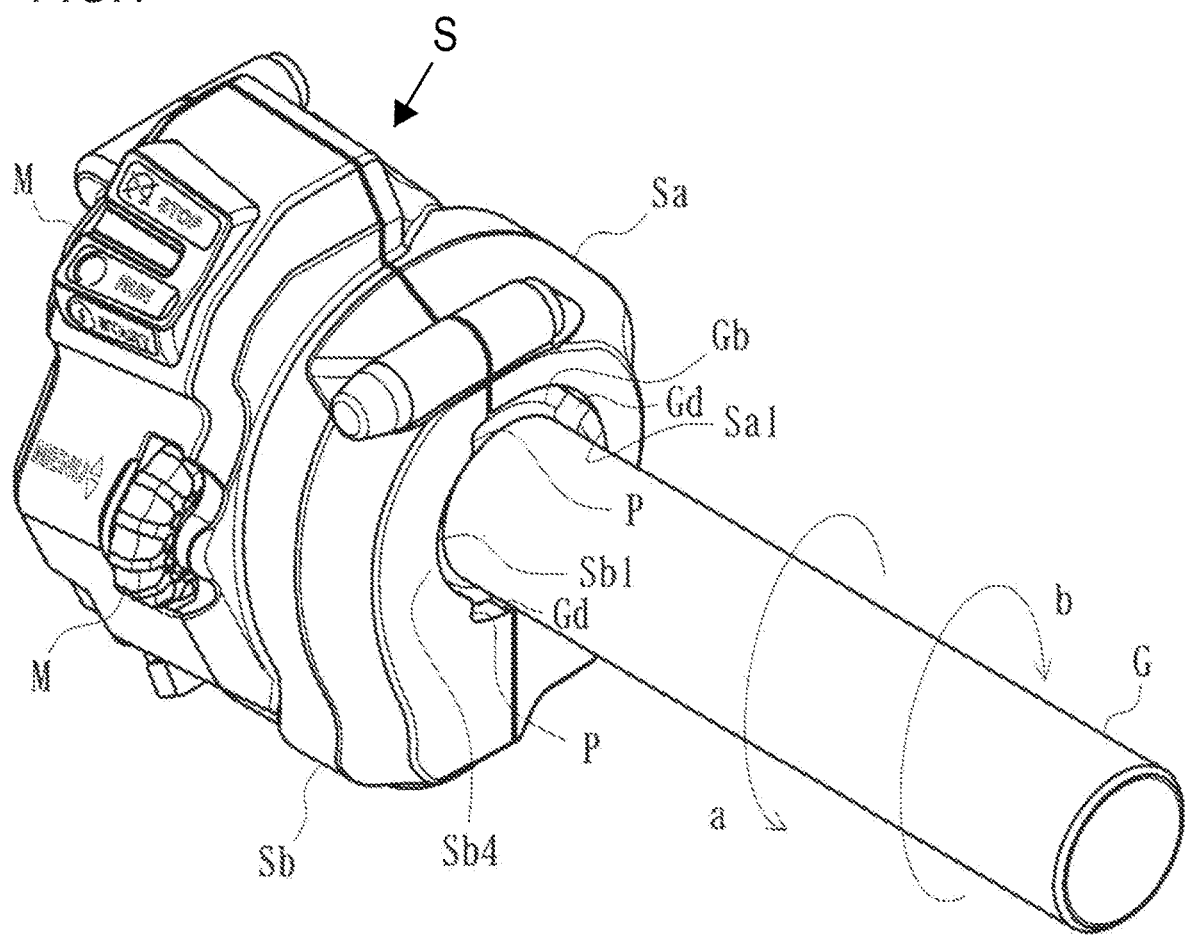
FIG. 1 is a perspective view illustrating a throttle grip device according to an embodiment of the present invention.

Hereinafter, an embodiment of the present invention will be specifically described with reference to the drawings.

The throttle grip device according to the present embodiment is for detecting the rotation angle of a throttle grip G attached to a handlebar H of a two-wheeled vehicle and sending the detection signal to an electronic control device such as an ECU mounted on the two-wheeled vehicle. As illustrated in FIGS. 1 to 12, the throttle grip device according to the present embodiment is configured to have the throttle grip G, a handle switch case S, an accommodating case 1, an interlocking member 2, a biasing force applying unit 3, a torsion coil spring 4, a coil spring 5, a rotating member 6, and a magnetic sensor 7 (rotation angle detection unit). It should be noted that reference numerals h1 and h2 in the drawings denote wires extending from the magnetic sensor 7 and an operation switch M.

The accommodating case 1 is arranged in the handle switch case S attached to the tip side of the two-wheeled vehicle (vehicle) handlebar H (base end side of the throttle grip G). The accommodating case 1 accommodates various components configuring the throttle grip device and rotatably holds, for example, the interlocking member 2, the biasing force applying unit 3, and the rotating member 6. In addition, a lid member F is attached to the accommodating case 1, an opening Fa is formed in the lid member F, and the front surface of the interlocking member 2 (surface where an engaging portion 2a is formed) faces the outside.

Figure 11:
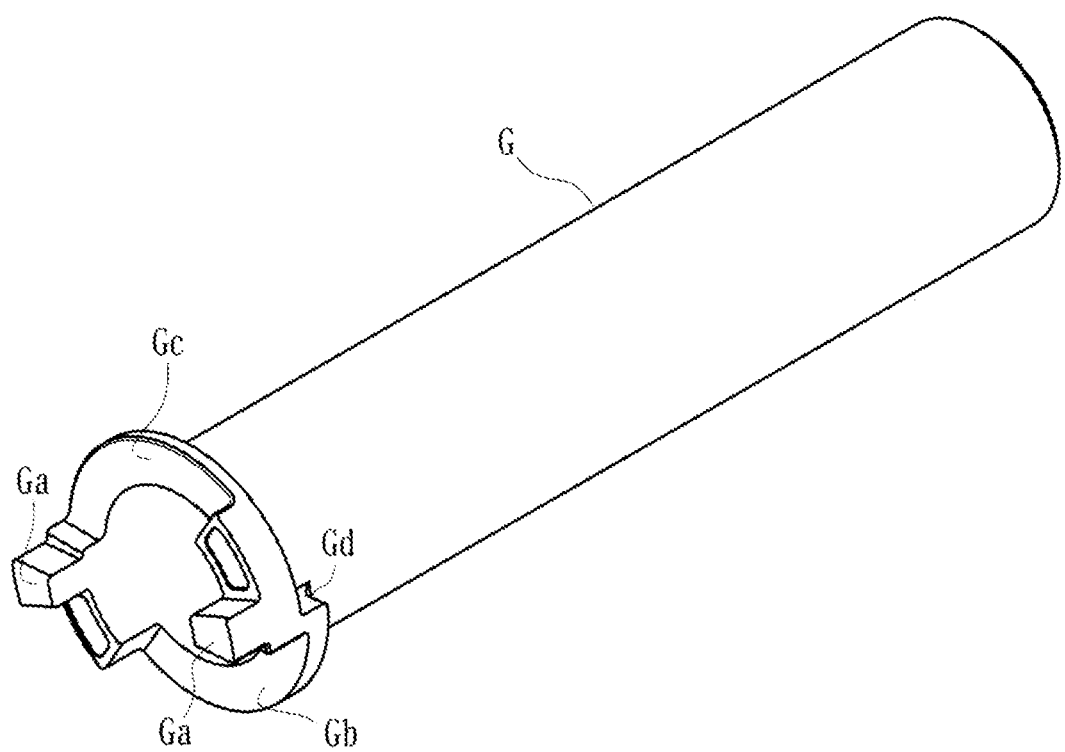
FIG. 11 is a perspective view illustrating a throttle grip of the throttle grip device.
Figure 12:
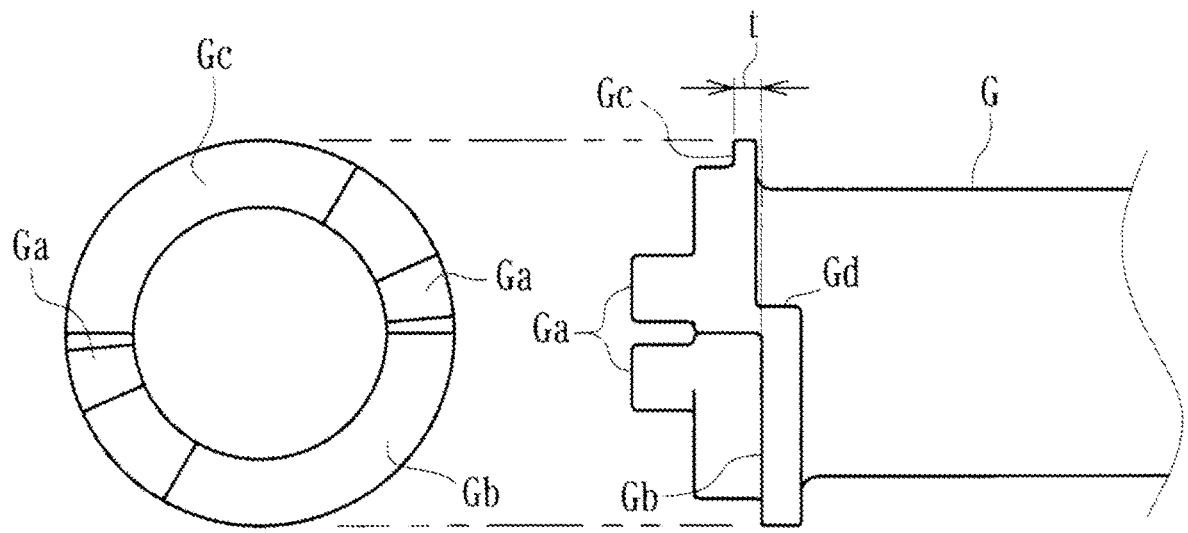
FIG. 12 is front and side views illustrating the base end portion of the throttle grip.

The throttle grip G extends from the handle switch case S and can be rotated while being gripped by a driver. As illustrated in FIG. 1, the throttle grip G is capable of forward rotation a in a predetermined direction around its axis from its initial position and reverse rotation b in the direction opposite to the predetermined direction. As illustrated in FIGS. 11 and 12, the base end portion of the throttle grip G is formed with an engaging portion Ga including a pair of protruding portions. The throttle grip G and the interlocking member 2 are connected by the engaging portion Ga engaging with the engaged portion 2a of the interlocking member 2 (see, for example, FIGS. 6 and 7).

Figure 9:
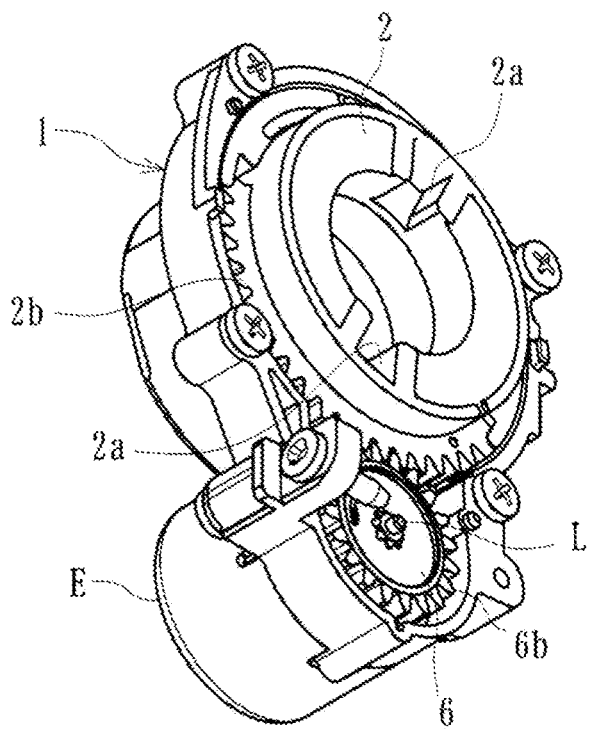
FIG. 9 is a perspective view illustrating a state where a lid member is removed from the accommodating case of the throttle grip device.
Figure 10:
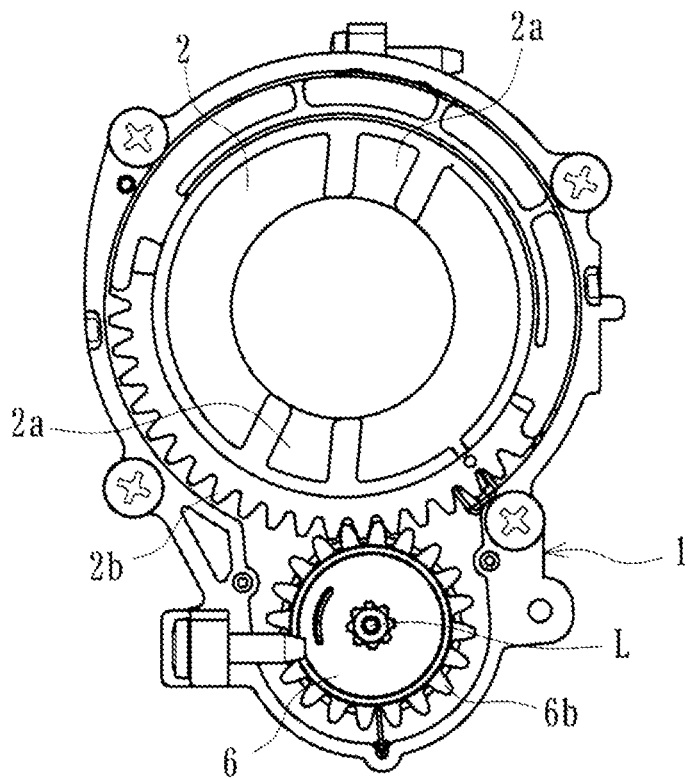
FIG. 10 is a front view illustrating a state where the lid member is removed from the accommodating case of the throttle grip device.

The interlocking member 2 has the engaged portion 2a that can be engaged with the engaging portion Ga formed on the throttle grip G and is capable of rotating in conjunction with the forward rotation a and the reverse rotation b of the throttle grip G. In addition, as illustrated in FIGS. 9 and 10, the interlocking member 2 according to the present embodiment is formed with a gear portion 2b at a part of its outer peripheral edge in addition to a pair of the engaged portions 2a. The gear portion 2b is assembled by meshing with a gear portion 6b formed over the entire outer peripheral edge of the rotating member 6.

The engaged portions 2a are recessed and respectively formed at positions corresponding to the engaging portion Ga of the throttle grip G. The base end side of the throttle grip G is connected to the interlocking member 2 in a state where the engaging portion Ga is fitted in and engaged with the engaged portion 2a. As a result, the interlocking member 2 is also capable of rotating as the throttle grip G rotates. The engaged portion 2a is formed on the surface of the interlocking member 2 (one surface capable of facing the outside when assembled to the accommodating case 1). The coil spring 5 is attached to the other surface.

The rotating member 6 has the gear portion 6b meshing with the gear portion 2b of the interlocking member 2 and is capable of rotating in conjunction with the interlocking member 2. The rotating member 6 is accommodated at a predetermined position in the accommodating case 1 and is rotatable about a shaft L (see FIGS. 8 to 10). With such a configuration, when the interlocking member 2 rotates, the rotating member 6 rotates about the shaft L at a rotation angle corresponding to the rotation angle.

In addition, in this configuration, a magnet 6a is attached to the shaft L, the magnet 6a rotates together with the rotating member 6, and the magnetic force generated from the magnet 6a changes with the rotation. A substrate 8 is fixed at a position facing the magnet 6a. The magnetic sensor 7 as a rotation angle detection unit is attached to the substrate 8. It should be noted that a magnetism-shielding shield case E is attached around the magnet 6a and the substrate 8.

The magnetic sensor 7 (rotation angle detection unit) includes a sensor capable of detecting a change in magnetism and is capable of detecting the rotation angle of the throttle grip G by detecting a change in the magnetism that is generated from the magnet 6a rotating together with the rotating member 6. Specifically, the magnetic sensor 7 is capable of obtaining an output voltage corresponding to a change in the magnetic field of the magnet 6a (change in magnetic flux density) and is configured by, for example, a Hall element as a magnetic sensor using the Hall effect (specifically, a linear Hall IC capable of obtaining an output voltage proportional to the magnetic field (magnetic flux density) of a magnet 6a).

Further, when the interlocking member 2 rotates in the same direction as the throttle grip G performs the forward rotation a, the rotating member 6 also rotates in conjunction and the magnet 6a attached to the rotating member 6 also rotates by the same angle in the same direction. As a result, the magnetic field changes depending on the rotation angle, and thus an output voltage corresponding to the rotation angle can be obtained and the rotation angle of the interlocking member 2 (that is, the rotation angle of the throttle grip G) can be detected based on the output voltage. The rotation angle of the throttle grip G detected in this manner is transmitted as an electric signal to the engine control unit (ECU) that is mounted on the two-wheeled vehicle. The engine of the vehicle can be controlled in accordance with the transmitted rotation angle of the throttle grip G.

On the other hand, when the interlocking member rotates in the same direction as the throttle grip G performs the reverse rotation b, the rotating member 6 also rotates in conjunction and the magnet 6a attached to the rotating member 6 also rotates by the same angle in the same direction. As a result, the magnetic field changes depending on the rotation angle, and thus an output voltage corresponding to the rotation angle can be obtained and the reverse rotation b of the throttle grip G can be detected.

When the reverse rotation b of the throttle grip G is detected in this manner, a predetermined function of the two-wheeled vehicle can be activated or deactivated. The present embodiment is applied to a two-wheeled vehicle provided with a constant vehicle speed-maintaining device (auto-cruise device) maintaining a constant travel speed. The present embodiment is configured such that the constant vehicle speed-maintaining control can be stopped (cancelled) when the reverse rotation b (rotation operation opposite in direction to the forward rotation a by which the throttle is fully opened from the initial position) is performed on the throttle grip G.

The torsion coil spring 4 is assembled with one end fixed to the accommodating case 1 and the other end fixed to the interlocking member 2. The torsion coil spring 4 is for biasing the interlocking member 2 toward the initial position in the event of the forward rotation a of the throttle grip G. In other words, in the event of the forward rotation a of the throttle grip G, the interlocking member 2 rotates against the biasing force of the torsion coil spring 4, and thus the biasing force is transmitted to the throttle grip G and a force acts to return the throttle grip G to the initial position.

The coil spring 5, which is attached to the interlocking member 2, is for biasing the interlocking member 2 toward the initial position in the event of the reverse rotation b of the throttle grip G. In other words, in the event of the reverse rotation b of the throttle grip G, the interlocking member 2 rotates against the biasing force of the coil spring 5, and thus the biasing force is transmitted to the throttle grip G and a force acts to return the throttle grip G to the initial position.

The biasing force applying unit 3 is attached at a position adjacent to the interlocking member 2. In this configuration, the biasing force applying unit 3 does not apply the biasing force of the coil spring 5 to the interlocking member 2 in the event of the forward rotation a of the throttle grip G (at this time, only the biasing force of the torsion coil spring 4 is applied to the interlocking member). The biasing force applying unit 3 is capable of applying the biasing force of the coil spring 5 to the interlocking member 2 in the event of the reverse rotation b of the throttle grip G.

Figure 2:
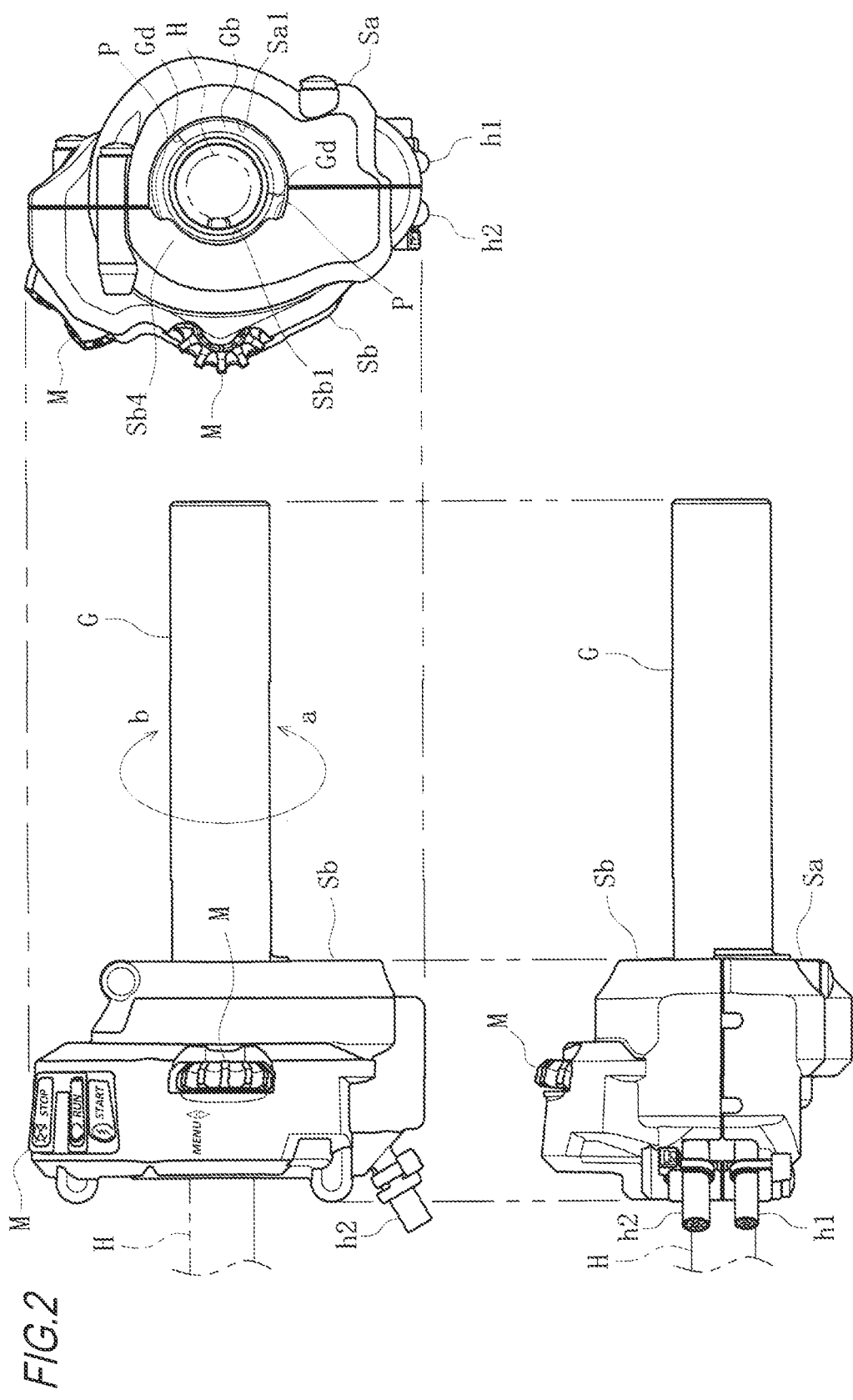
FIG. 2 is a three-sided view illustrating the throttle grip device.

As illustrated in FIGS. 1 and 2, the handle switch case S is formed with the operation switches M for operating various vehicular electrical components and is fixed to the tip portion of the handlebar H. The handle switch case S is configured to have a first case member Sa to which the accommodating case 1 is fixed and a second case member Sb, which is aligned with the first case member Sa to form an accommodating space covering the accommodating case 1. In other words, the handle switch case S according to the present embodiment is configured to have the first case member Sa and the second case member Sb that are split in half and the accommodating case 1 where the interlocking member 2, the magnetic sensor 7, and the like are arranged is accommodated in the accommodating space that is formed by aligning the first case member Sa and the second case member Sb.

Figure 4:
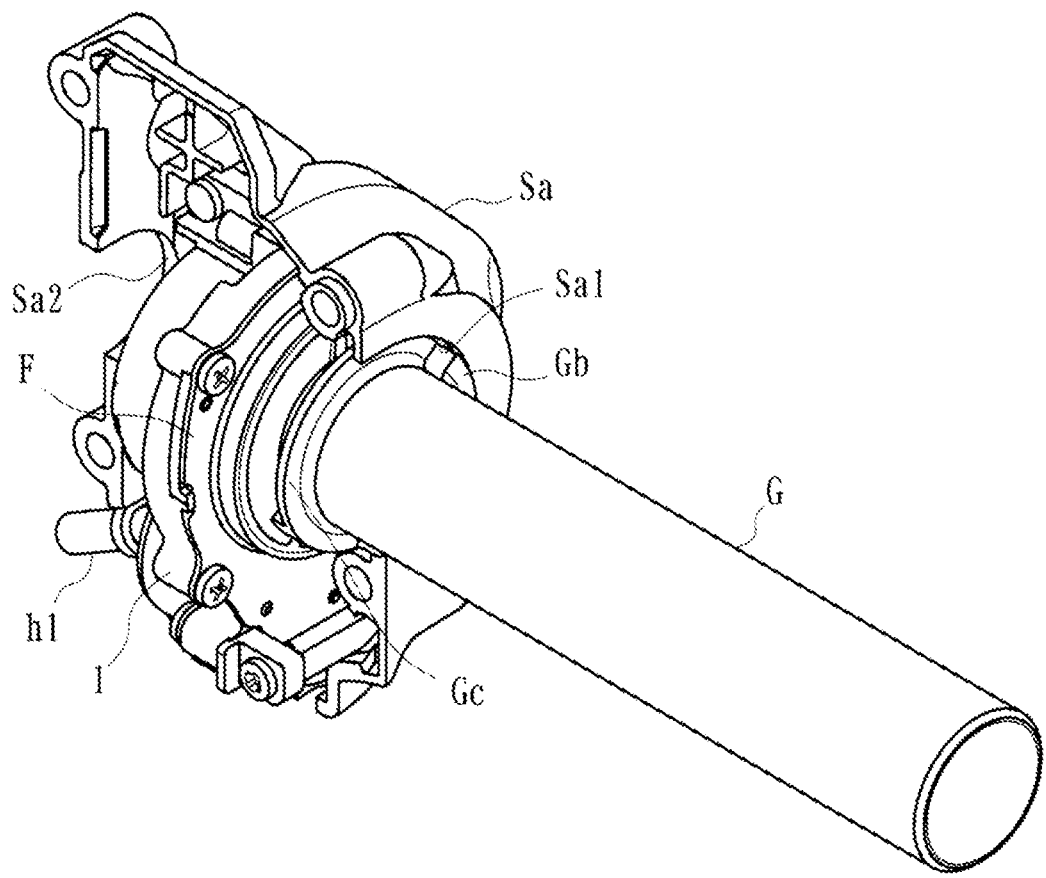
FIG. 4 is a perspective view illustrating a state where a second case member of the throttle grip device is removed.
Figure 5:
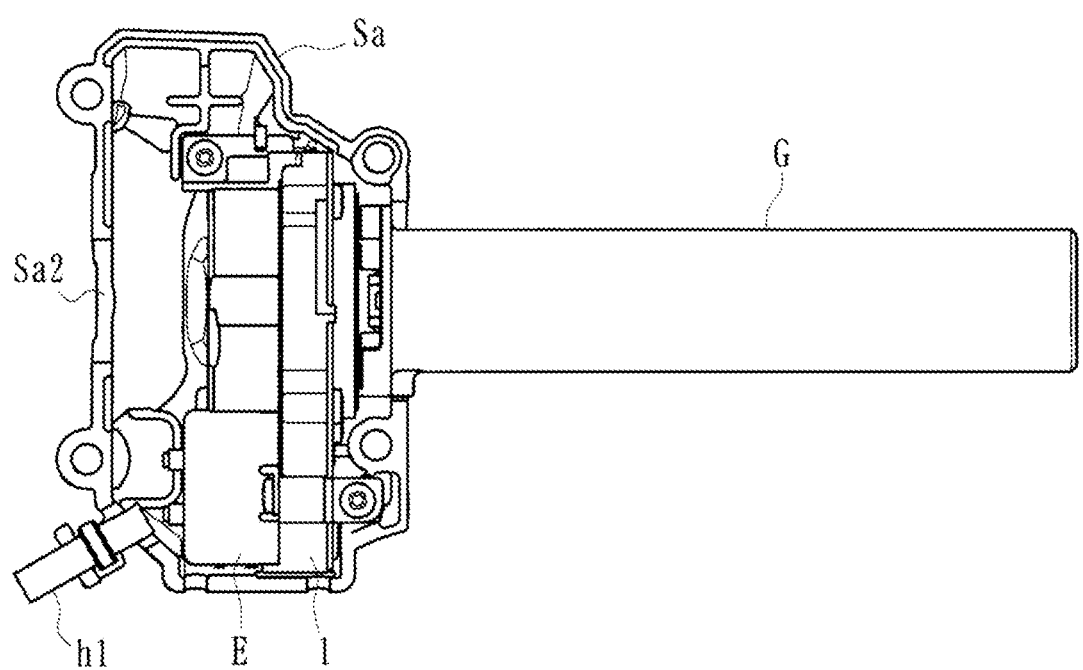
FIG. 5 is a front view illustrating a state where the second case member of the throttle grip device is removed.
Figure 6:
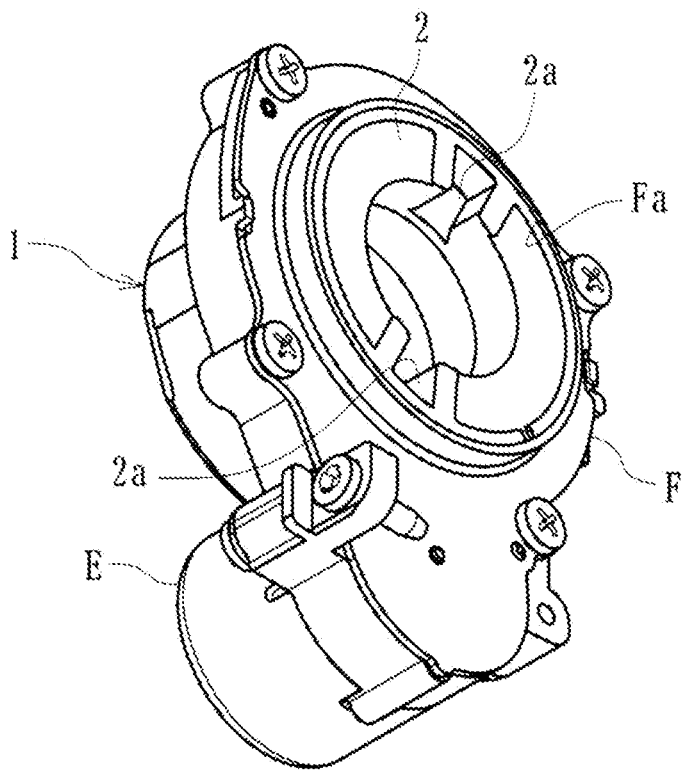
FIG. 6 is a perspective view illustrating an accommodating case of the throttle grip device (state where a component is accommodated in the accommodating case).
Figure 7:
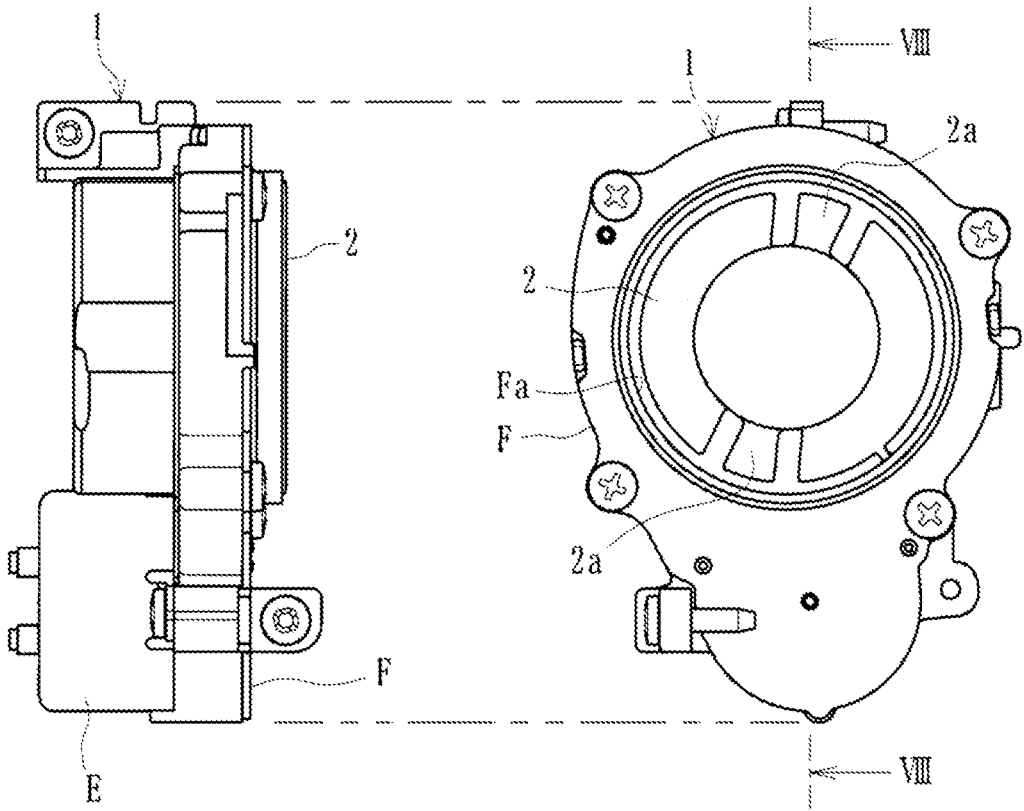
FIG. 7 is front and side views illustrating the accommodating case of the throttle grip device (state where a component is accommodated in the accommodating case).
Figure 8:
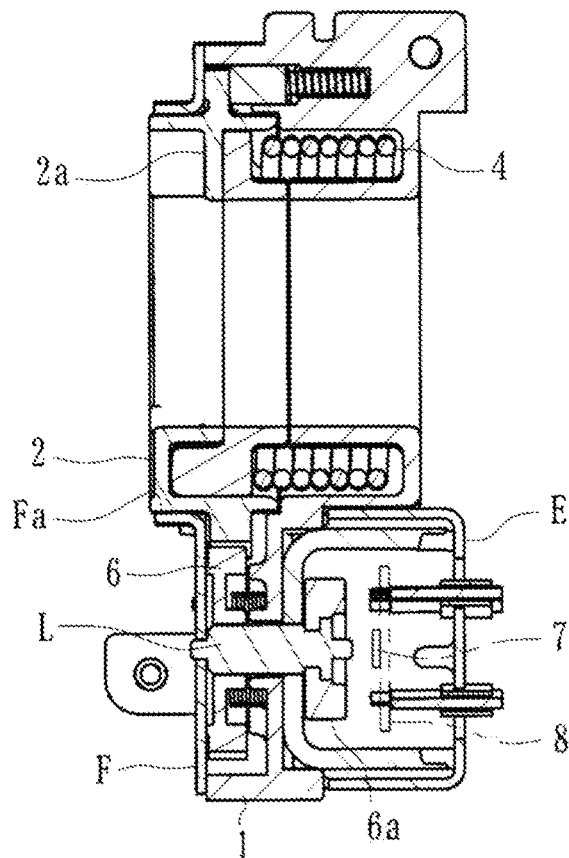
FIG. 8 is a cross-sectional view taken along line VIII-VIII in FIG. 7.
Figure 13:
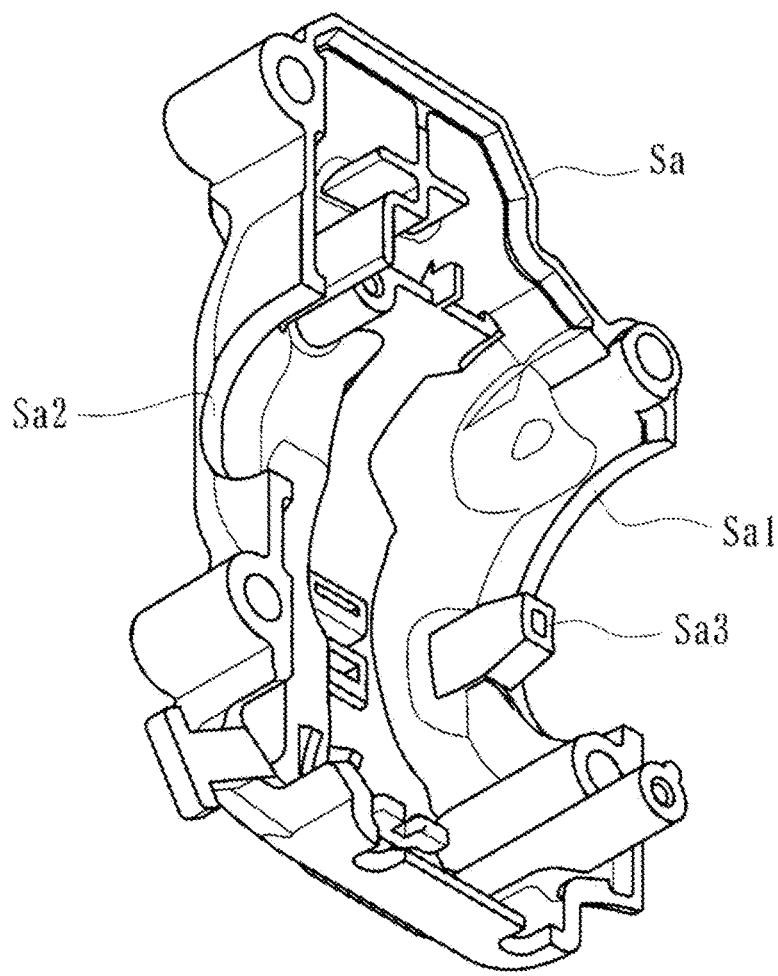
FIG. 13 is a perspective view illustrating a first case member of the throttle grip device.
Figure 14:
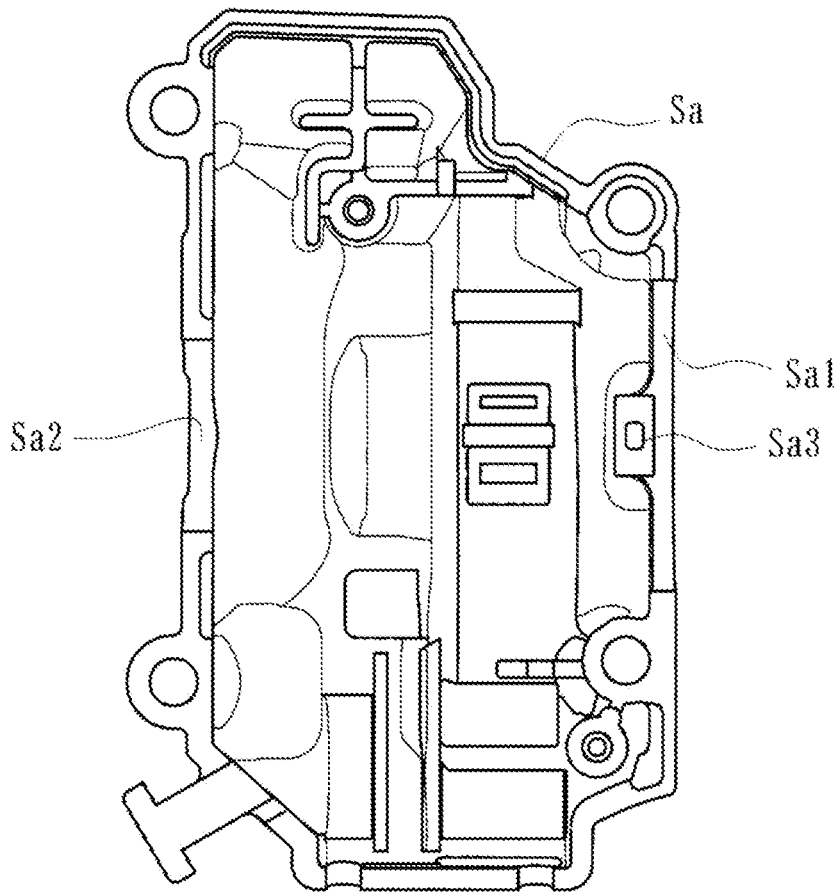
FIG. 14 is a side view illustrating the first case member.

As for the first case member Sa, as illustrated in FIGS. 13 and 14, an opening Sa1 through which the base end portion of the throttle grip G is inserted is formed in one side surface and an opening Sa2 through which the handlebar H is inserted is formed in the other side surface. Further, as illustrated in FIGS. 4 and 5, the accommodating case 1 accommodating the interlocking member 2, the magnetic sensor 7, and the like is assembled to the first case member Sa and the throttle grip G is attached to the interlocking member 2 accommodated in the accommodating case 1.

Further, a first support portion Sa3 is formed so as to protrude at a part inside the opening Sa1 of the first case member Sa. The first support portion Sa3 has a protruding end abutting against the outer peripheral surface of the handlebar H to support the first case member Sa with respect to the up-down direction and faces the base end portion of the throttle grip G to position the throttle grip G with respect to the pushing direction (left direction in FIG. 3).

Figure 15:
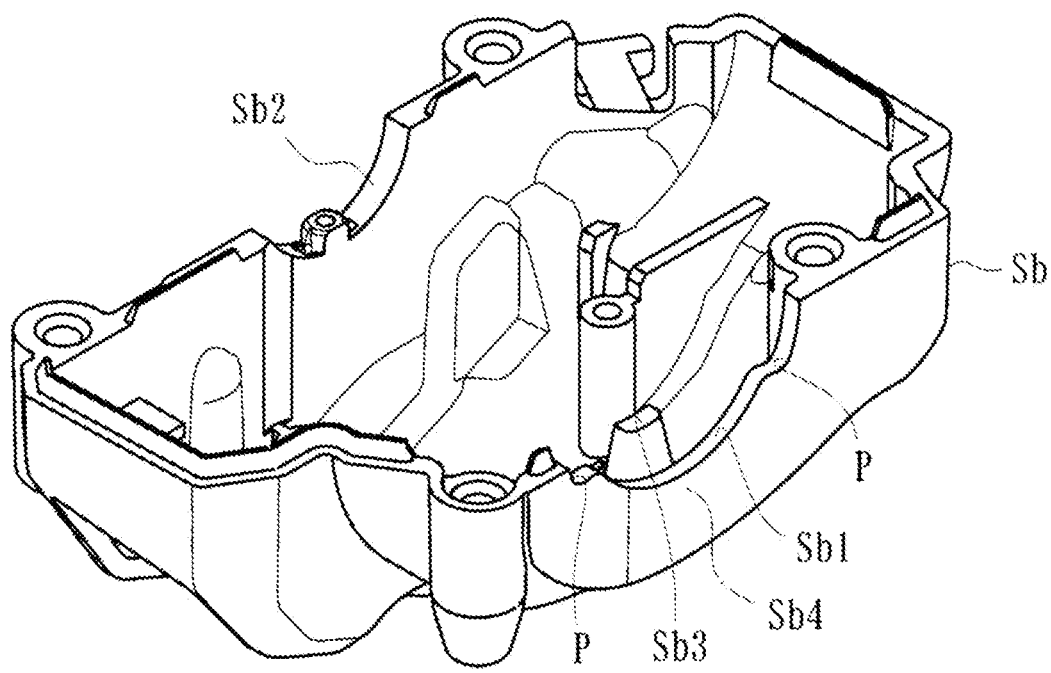
FIG. 15 is a perspective view illustrating the second case member of the throttle grip device.
Figure 16:
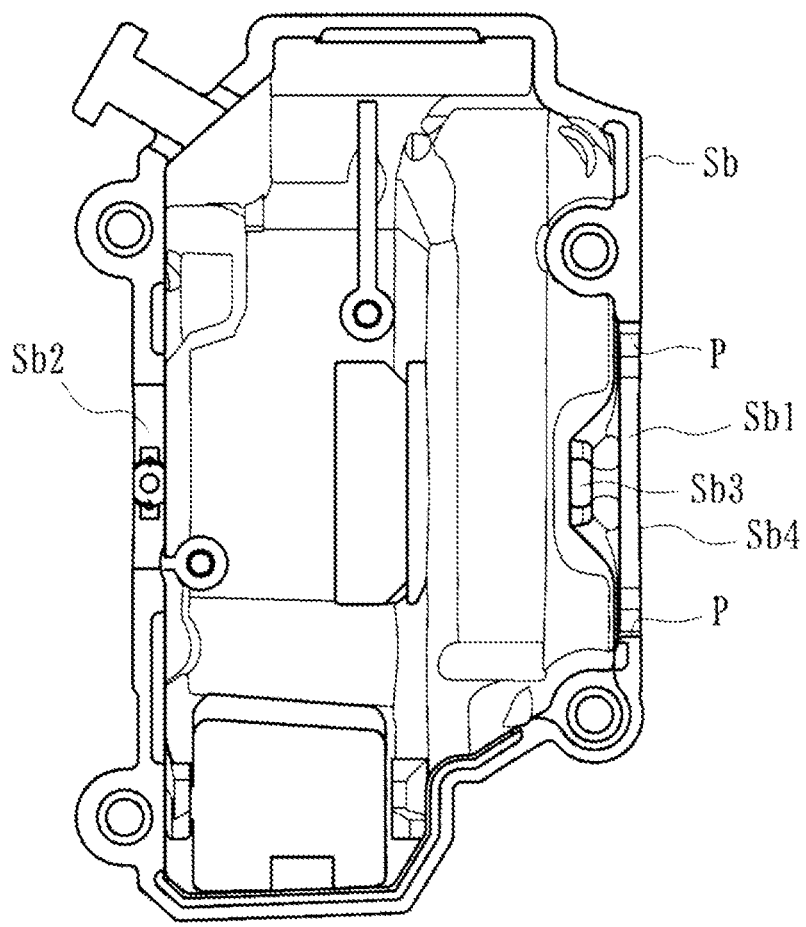
FIG. 16 is a side view illustrating the second case member.

As for the second cover member Sb, as illustrated in FIGS. 15 and 16, an opening Sb1 through which the base end portion of the throttle grip G is inserted is formed in one side surface and an opening Sb2 through which the handlebar H is inserted is formed in the other side surface. In addition, the operation switches M for operating various vehicular electrical components are attached to the second cover member Sb. The second cover member Sb configures the handle switch case S by being assembled in alignment with the first case member Sa to which the accommodating case 1 is assembled.

Further, a second support portion Sb3 is formed so as to protrude at a part inside the opening Sb1 of the second case member Sb. The second support portion Sb3 has a protruding end abutting against the outer peripheral surface of the handlebar H to support the second case member Sb with respect to the up-down direction and faces the base end portion of the throttle grip G to position the throttle grip G with respect to the pushing direction (left direction in FIG. 3).

Here, as illustrated in FIGS. 11 and 12, the base end portion of the throttle grip G according to the present embodiment has, in addition to the engaging portion Ga, a first flange region portion Gb and a second flange region portion Gc formed over a predetermined range in the circumferential direction. As illustrated in FIG. 12, the first flange region portion Gb and the second flange region portion Gc are respectively formed at positions offset by a predetermined dimension t with respect to the axial direction of the throttle grip G (left-right direction in the drawing). In addition, in the first case member Sa and the second case member Sb, the first support portion Sa3 and the second support portion Sb3 are formed so as to protrude at positions corresponding to the first flange region portion Gb and the second flange region portion Gc, respectively.

More specifically, the base end portion of the throttle grip G is formed with a flange extending in the circumferential direction, the flange has a pair of the engaging portions Ga, the first flange region portion Gb, and the second flange region portion Gc formed over the circumferential direction as illustrated in FIGS. 11 and 12, and the first flange region portion Gb and the second flange region portion Gc are mutually offset (misaligned) in the axial direction.

Figure 3:
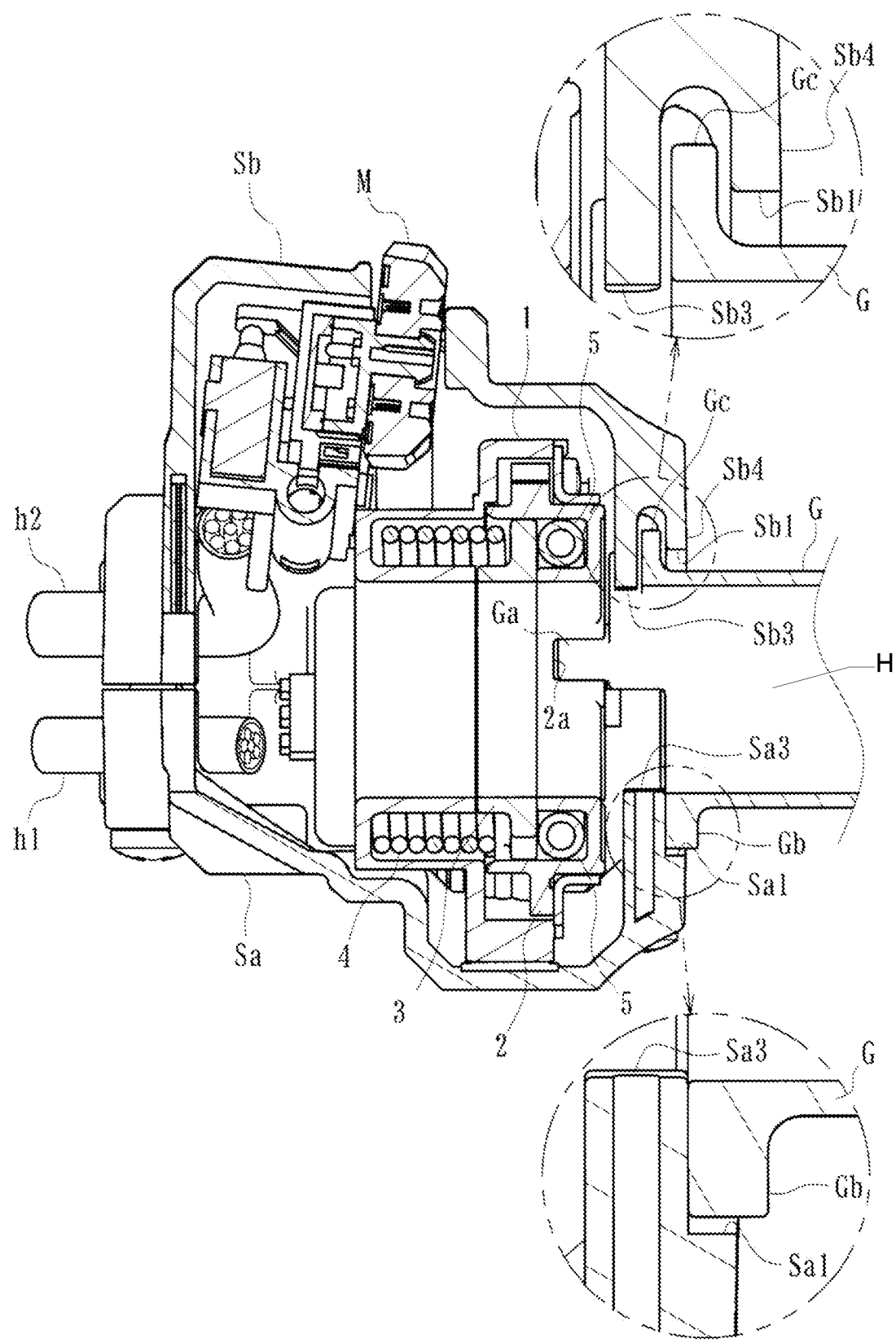
FIG. 3 is a cross-sectional view illustrating the throttle grip device.
Figure 17:
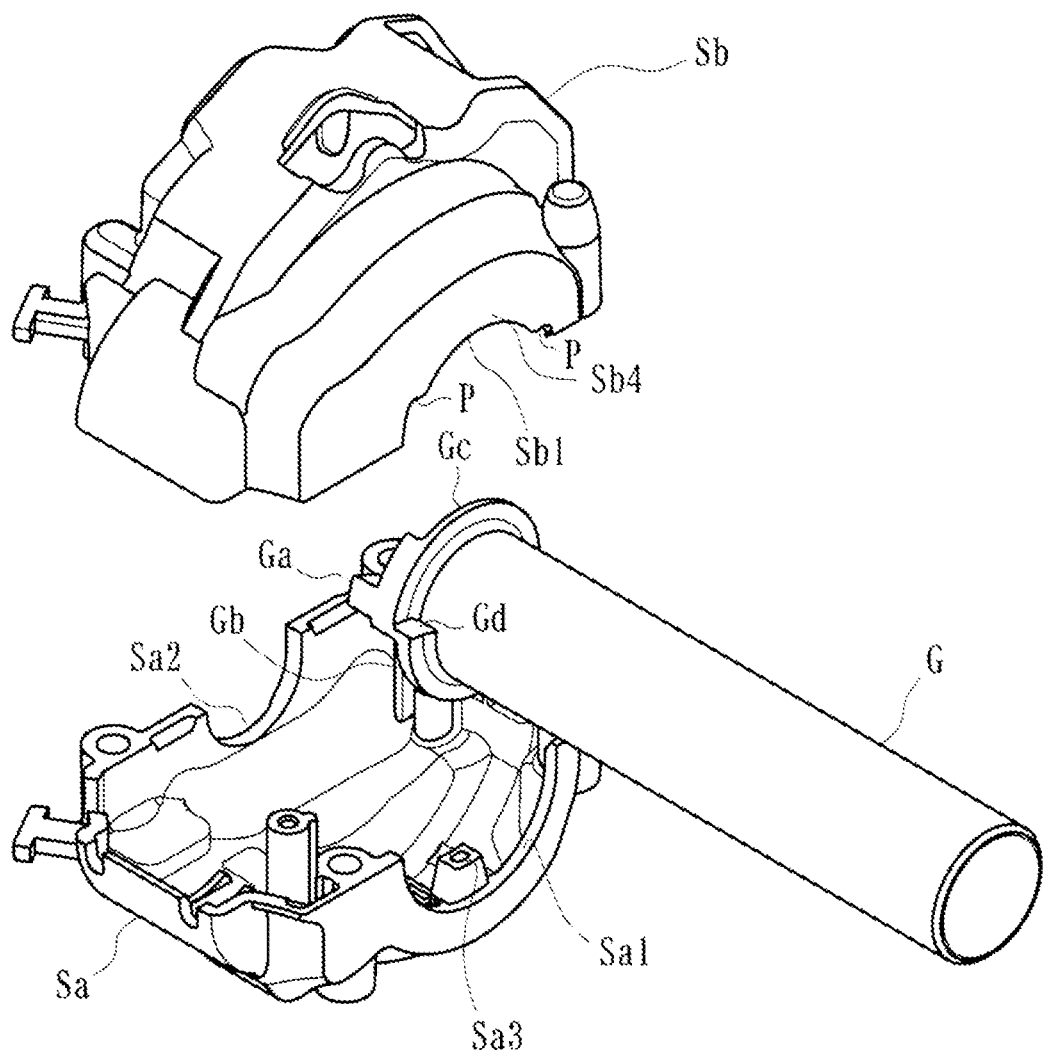
FIG. 17 is an exploded perspective view illustrating the first case member, the second case member, and the throttle grip in the throttle grip device.

The first flange region portion Gb includes a region formed closer to the tip side of the throttle grip G (right side in FIG. 12) than the second flange region portion Gc. As illustrated in FIG. 3, the first flange region portion Gb faces the first support portion Sa3 in a state where the base end portion of the throttle grip G is attached to the opening Sa1 of the first case member Sa. In other words, as illustrated in FIG. 17, the first support portion Sa3 is formed so as to protrude at a position corresponding to the first flange region portion Gb and, when the base end portion of the throttle grip G is assembled to the opening Sa1 of the first case member Sa, the first support portion Sa3 is capable of facing the first flange region portion Gb and positioning the base end portion of the throttle grip G with respect to the pushing direction.

Figure 18:
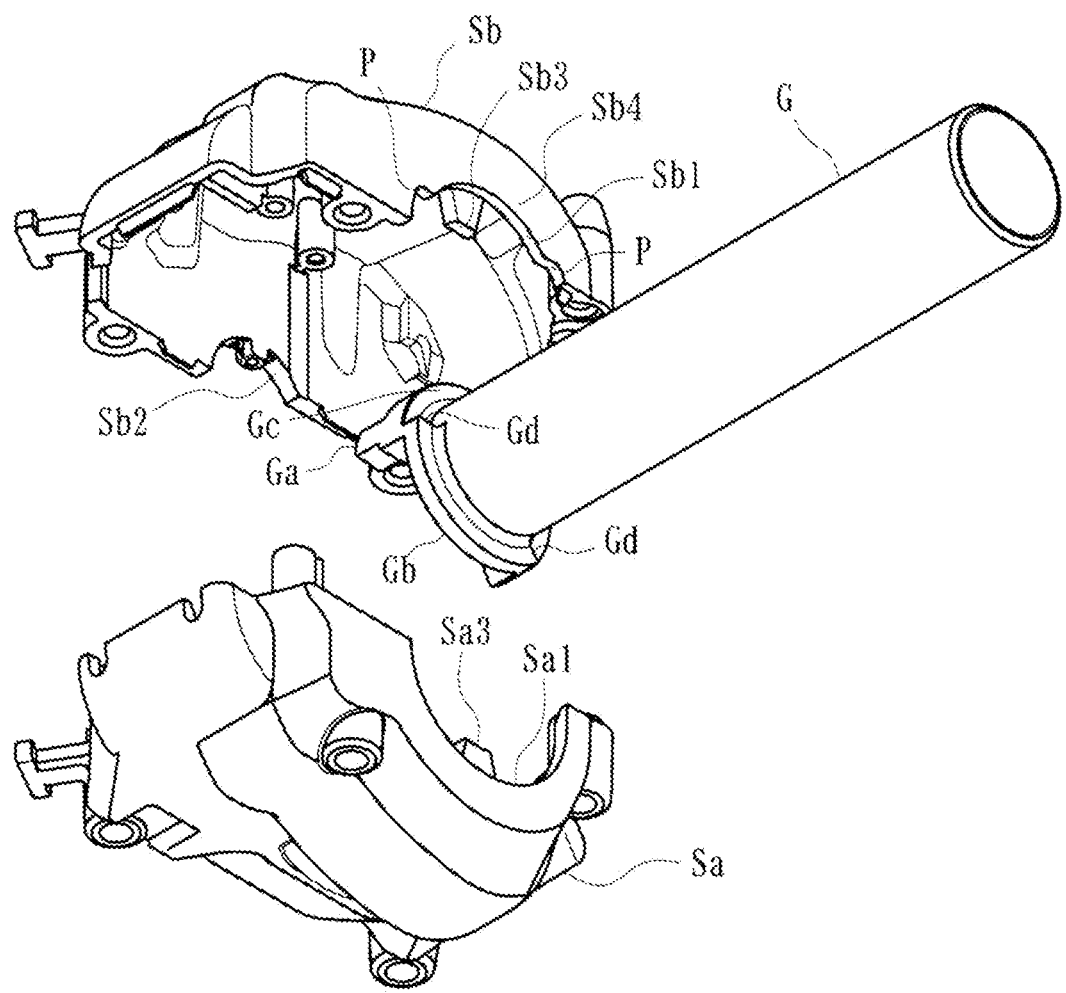
FIG. 18 is an exploded perspective view illustrating the first case member, the second case member, and the throttle grip in the throttle grip device.

The second flange region portion Gc includes a region formed closer to the base end side of the throttle grip G (left side in FIG. 12) than the first flange region portion Gb. As illustrated in FIG. 3, the second flange region portion Gc faces the second support portion Sb3 in a state where the base end portion of the throttle grip G is attached to the opening Sb1 of the second case member Sb. In other words, as illustrated in FIG. 18, the second support portion Sb3 is formed so as to protrude at a position corresponding to the second flange region portion Gc and, when the base end portion of the throttle grip G is assembled to the opening Sb1 of the second case member Sb, the second support portion Sb3 is capable of facing the second flange region portion Gc and positioning the base end portion of the throttle grip G with respect to the pushing direction.

In addition, as illustrated in FIGS. 1 and 2, the diameter dimension of the opening Sa1 of the first case member Sa is set to be larger than the diameter dimension of the opening Sb1 of the second case member Sb (the opening diameter of the opening Sa1>the opening diameter of the opening Sb1), the gap between the opening Sa1 of the first case member Sa and the base end portion of the throttle grip G is covered with the first flange region portion Gb, and the edge portion of the opening Sb1 of the second case member Sb is formed with a retainer portion Sb4 capable of covering and retaining the second flange region portion Gc in the base end portion of the throttle grip G.

In other words, the opening Sa1 of the first case member Sa is open wide to improve the assemblability of the throttle grip G, and the gap between the opening Sa1 of the first case member Sa and the base end portion of the throttle grip G resulting from the wide opening is covered with the first flange region portion Gb formed in the base end portion of the throttle grip G. In addition, the opening Sb1 of the second case member Sb is smaller than the opening Sa1 to be capable of forming the retainer portion Sb4 capable of covering and retaining the second flange region portion Gc formed in the base end portion of the throttle grip G.

Meanwhile, as illustrated in FIG. 3, the second flange region portion Gc in the base end portion of the throttle grip G is positioned and attached between the second support portion Sb3 and the retainer portion Sb4. In other words, as illustrated in FIGS. 15 and 16, a gap corresponding to the thickness dimension of the second flange region portion Gc is formed between the second support portion Sb3 and the retainer portion Sb4 and, in a state where the base end portion of the throttle grip G is attached to the opening Sb1 of the second case member Sb, the second flange region portion Gc is fitted into the gap.

As a result, one surface of the second flange region portion Gc faces the second support portion Sb3 and the other surface of the second flange region portion Gc faces the retainer portion Sb4. Accordingly, in a case where a pulling-direction load is applied to the throttle grip G, the other surface of the second flange region portion Gc abuts against the second support portion Sb3 and retaining is possible while sufficiently withstanding the load.

Further, as illustrated in FIG. 12, in the base end portion of the throttle grip G, a pair of stepped portions Gd (one stepped portion Gd and the other stepped portion Gd in the circumferential direction) corresponding to the offset are formed in the boundary portion between the first flange region portion Gb and the second flange region portion Gc. In addition, as illustrated in FIGS. 1, 15, and 16, in the edge portion of the opening (Sa1, Sb1) of at least one of the first case member Sa and the second case member Sb (edge portion of the opening Sb1 of the second case member Sb in the present embodiment), two stopper portions P (one stopper portion P abutting against one stepped portion Gd and the other stopper portion P abutting against the other stepped portion Gd) are formed to abut against the stepped portions Gd and regulate the rotation range of the throttle grip G.

As a result, when the upper limit rotation angle is reached in the process of the forward rotation a of the throttle grip G, one stepped portions Gd interferes with one stopper portion P and the rotation operation of further forward rotation a can be regulated. In addition, when the upper limit rotation angle is reached in the process of the reverse rotation b of the throttle grip G, the other stepped portion Gd interferes with the other stopper portion P and the rotation operation of further reverse rotation b can be regulated.

Next, a method for assembling the throttle grip G will be described.

First, with the interlocking member 2, the magnetic sensor 7, and the like assembled, the accommodating case 1 is fixed to a predetermined position in the first case member Sa with a screw or the like. Then, as illustrated in FIGS. 4 and 5, the base end portion of the throttle grip G is inserted through the opening Sa1. At this time, the first flange region portion Gb in the base end portion of the throttle grip G faces the first support portion Sa3 of the first case member Sa. As a result, in a case where a pushing-direction load is applied to the throttle grip G, one surface of the first flange region portion Gb abuts against the first support portion Sa3 and the load can be sufficiently withstood.

After that, the handle switch case S is configured by assembling the second case member Sb to the first case member Sa. At this time, the second flange region portion Gc in the base end portion of the throttle grip G faces the second support portion Sb3 of the second case member Sb. In this manner, it is possible to obtain a throttle grip device to which the throttle grip G is assembled with the accommodating case 1 accommodated in the handle switch case S.

According to the present embodiment, the first flange region portion Gb and the second flange region portion Gc are respectively formed at positions offset by a predetermined dimension with respect to the axial direction of the throttle grip G, and the first support portion Sa3 and the second support portion Sb3 are formed so as to protrude at positions corresponding to the first flange region portion Gb and the second flange region portion Gc, respectively. Accordingly, the base end portion of the throttle grip G can be easily assembled in a set regular orientation with respect to the openings (Sa1, Sb1) of the first case member Sa and the second case member Sb.

In addition, according to the present embodiment, the stepped portion Gd corresponding to the offset is formed in the boundary portion between the first flange region portion Gb and the second flange region portion Gc, and the stopper portion P is formed in the opening edge portion of at least one of the first case member Sa and the second case member Sb to abut against the stepped portion Gd and regulate the rotation range of the throttle grip G. Accordingly, the stepped portion Gd abutting against the stopper portion P can be formed using the offset between the first flange region portion Gb and the second flange region portion Gc.

Further, according to the present embodiment, the diameter dimension of the opening Sa1 of the first case member Sa is set to be larger than the diameter dimension of the opening Sb1 of the second case member Sb, the gap between the opening Sa1 of the first case member Sa and the base end portion of the throttle grip G is covered with the first flange region portion Gb, and the edge portion of the opening Sb1 of the second case member Sb is formed with the retainer portion Sb4 capable of covering and retaining the second flange region portion Gc in the base end portion of the throttle grip G. Accordingly, it is possible to improve dust resistance by covering the gap between the opening Sa1 of the first case member Sa and the base end portion of the throttle grip G with the first flange region portion Gb while improving workability in assembling the throttle grip G to the first case member Sa and retaining is possible with the pulling-direction load on the throttle grip G sufficiently withstood.

In other words, it is possible to improve workability in assembling the throttle grip G by assembling the second case member Sb to the first case member Sa after attaching the base end portion of the throttle grip G to the opening Sa1 of the first case member Sa with a large opening dimension, it is possible to improve dust resistance by covering and hiding the gap between the opening Sa1 of the first case member Sa and the base end portion of the throttle grip G with the first flange region portion Gb, and the throttle grip G can be reliably retained by the retainer portion Sb4 when a pulling-direction load is applied to the throttle grip G.

Furthermore, the second flange region portion Gc in the base end portion of the throttle grip G is positioned and attached between the second support portion Sb3 and the retainer portion Sb4, and thus the second flange region portion Gc can be held between the second support portion Sb3 and the retainer portion Sb4 and, when a pulling-direction load is applied to the throttle grip G, the pulling-direction load can be sufficiently withstood by the second flange region portion Gc abutting against the retainer portion Sb4.

In addition, the first case member Sa and the second case member Sb include the handle switch case S formed with the operation switches M for operating various vehicular electrical components, and thus the function of accommodating the interlocking member 2 and the magnetic sensor 7 (rotation angle detection unit) (specifically, accommodating the accommodating case 1 having the interlocking member 2, the magnetic sensor 7, and the like) and the function as a handle switch can be provided at the same time.

The present invention is not limited to the present embodiment described above. For example, the throttle grip G is not limited to being capable of the forward rotation a and the reverse rotation b as in the present embodiment. The throttle grip G that is capable of the single rotation operation of the forward rotation a may be provided, a biasing unit different in form from the torsion coil spring 4 and the coil spring 5 may be provided, or either one of the biasing unit may be provided.

Further, although the present embodiment is configured such that the constant vehicle speed-maintaining control of the constant vehicle speed-maintaining device (auto-cruise device) is stopped (cancelled) in the event of the reverse rotation b of the throttle grip G, it suffices if a predetermined vehicular function is activated or deactivated when the reverse rotation of the throttle grip G is detected. For example, authentication initiation in an immobilizer system or a smart entry system, an engine-starting starter operation, a lighting unit operation in emergency such as a hazard, and the like may be performed by the reverse rotation of the throttle grip G. It should be noted that the applicable vehicles may be other vehicles with the handlebar H (such as ATVs and snowmobiles) without being limited to two-wheeled vehicles as in the present embodiment.

With the throttle grip device in which the base end portion of the throttle grip has the first flange region portion and the second flange region portion formed over a predetermined range in the circumferential direction, the first flange region portion and the second flange region portion are respectively formed at positions offset by a predetermined dimension with respect to the axial direction of the throttle grip, and the first support portion and the second support portion are formed so as to protrude at positions corresponding to the first flange region portion and the second flange region portion, respectively, application is also possible to, for example, those different in appearance shape or those to which other functions are added.

According to an aspect of the present invention, there is provided a throttle grip device including: a throttle grip attached to a handlebar of a vehicle and capable of a rotation operation by a driver; an interlocking member having an engaged portion engageable with an engaging portion formed on the throttle grip and rotatable in conjunction with the throttle grip; a rotation angle detection unit capable of detecting a rotation angle of the throttle grip by detecting a rotation angle of the interlocking member; a first case member and a second case member formed with openings through which a base end portion of the throttle grip is inserted and accommodating the interlocking member and the rotation angle detection unit; and a first support portion and a second support portion formed so as to protrude on the first case member and the second case member, respectively, having protruding ends abutting against an outer peripheral surface of the handlebar to support the first case member and the second case member, and positioned so as to face the base end portion of the throttle grip, the throttle grip device being capable of controlling an engine of the vehicle in accordance with the rotation angle of the throttle grip detected by the rotation angle detection unit, where the base end portion of the throttle grip has a first flange region portion and a second flange region portion formed over a predetermined range in a circumferential direction, the first flange region portion and the second flange region portion are respectively formed at positions offset by a predetermined dimension with respect to an axial direction of the throttle grip, and the first support portion and the second support portion are formed so as to protrude at positions corresponding to the first flange region portion and the second flange region portion, respectively.

According to the above, the first flange region portion and the second flange region portion are respectively formed at positions offset by a predetermined dimension with respect to the axial direction of the throttle grip, and the first support portion and the second support portion are formed so as to protrude at positions corresponding to the first flange region portion and the second flange region portion, respectively. Accordingly, the base end portion of the throttle grip can be easily assembled in a set regular orientation with respect to the openings of the first case member and the second case member.

In the throttle grip device, a stepped portion corresponding to the offset may be formed in a boundary portion between the first flange region portion and the second flange region portion, and an opening edge portion of at least one of the first case member and the second case member may be formed with a stopper portion abutting against the stepped portion and regulating a rotation range of the throttle grip.

According to the above, the stepped portion corresponding to the offset is formed in the boundary portion between the first flange region portion and the second flange region portion, and the stopper portion is formed in the opening edge portion of at least one of the first case member and the second case member to abut against the stepped portion and regulate the rotation range of the throttle grip. Accordingly, the stepped portion abutting against the stopper portion can be formed using the offset between the first flange region portion and the second flange region portion.

In the throttle grip device, a diameter dimension of the opening of the first case member may be set to be larger than a diameter dimension of the opening of the second case member, a gap between the opening of the first case member and the base end portion of the throttle grip may be covered with the first flange region portion, and an opening edge portion of the second case member may be formed with a retainer portion capable of covering and retaining the second flange region portion in the base end portion of the throttle grip.

According to the above, the diameter dimension of the opening of the first case member is set to be larger than the diameter dimension of the opening of the second case member, the gap between the opening of the first case member and the base end portion of the throttle grip is covered with the first flange region portion, and the edge portion of the opening of the second case member is formed with the retainer portion capable of covering and retaining the second flange region portion in the base end portion of the throttle grip. Accordingly, it is possible to improve dust resistance by covering the gap between the opening of the first case member and the base end portion of the throttle grip with the first flange region portion while improving workability in assembling the throttle grip to the first case member and retaining is possible with the pulling-direction load on the throttle grip sufficiently withstood.

In other words, it is possible to improve workability in assembling the throttle grip by assembling the second case member to the first case member after attaching the base end portion of the throttle grip to the opening of the first case member with a large opening dimension, it is possible to improve dust resistance by covering and hiding the gap between the opening of the first case member and the base end portion of the throttle grip with the first flange region portion, and the throttle grip can be reliably retained by the retainer portion when a pulling-direction load is applied to the throttle grip.

In the throttle grip device, the second flange region portion in the base end portion of the throttle grip may be positioned and attached between the second support portion and the retainer portion.

According to the above, the second flange region portion in the base end portion of the throttle grip is positioned and attached between the second support portion and the retainer portion, and thus the second flange region portion can be held between the second support portion and the retainer portion and, when a pulling-direction load is applied to the throttle grip, the pulling-direction load can be sufficiently withstood by the second flange region portion abutting against the retainer portion.

In the throttle grip device, the first case member and the second case member may include a handle switch case formed with operation switches for operating various vehicular electrical components.

According to the above, the first case member and the second case member include the handle switch case formed with the operation switches for operating various vehicular electrical components, and thus the function of accommodating the interlocking member and the rotation angle detection unit and the function as a handle switch can be provided at the same time.

The invention claimed is:

1. A throttle grip device comprising:
   a throttle grip attached to a handlebar of a vehicle and capable of a rotation operation by a driver;
   an interlocking member having an engaged portion engageable with an engaging portion formed on the throttle grip and rotatable in conjunction with the throttle grip;
   a rotation angle detection unit capable of detecting a rotation angle of the throttle grip by detecting a rotation angle of the interlocking member;
   a first case member and a second case member formed with openings through which a base end portion of the throttle grip is inserted and accommodating the interlocking member and the rotation angle detection unit; and
   a first support portion and a second support portion formed so as to protrude on the first case member and the second case member, respectively, having protruding ends abutting against an outer peripheral surface of the handlebar to support the first case member and the second case member, and positioned so as to face the base end portion of the throttle grip, the throttle grip device being capable of controlling an engine of the vehicle in accordance with the rotation angle of the throttle grip detected by the rotation angle detection unit,
   wherein the base end portion of the throttle grip has a first flange region portion and a second flange region portion formed over a predetermined range in a circumferential direction, the first flange region portion and the second flange region portion are respectively formed at different positions offset from each other by a predetermined dimension with respect to an axial direction of the throttle grip, and the first support portion and the second support portion are formed so as to protrude at positions corresponding to the first flange region portion and the second flange region portion, respectively, and
   wherein a diameter dimension of the opening of the first case member is set to be larger than a diameter dimension of the opening of the second case member, a gap between the opening of the first case member and the base end portion of the throttle grip is covered with the first flange region portion, and the opening of the second case member is formed with a retainer portion capable of covering and retaining the second flange region portion in the base end portion of the throttle grip.

2. The throttle grip device according to claim 1, wherein a stepped portion corresponding to the predetermined dimension that the different positions are offset from each other is formed in a boundary portion between the first flange region portion and the second flange region portion, and an opening edge portion of at least one of the first case member and the second case member is formed with a stopper portion abutting against the stepped portion and regulating a rotation range of the throttle grip.

3. The throttle grip device according to claim 1 wherein the second flange region portion in the base end portion of the throttle grip is positioned and attached between the second support portion and the retainer portion.

4. The throttle grip device according to claim 1, further comprising a handle switch case comprising the first case member, the second case member, a and operation switches for operating various vehicular electrical components.

* * * * *

UNITED STATES PATENT AND TRADEMARK OFFICE
CERTIFICATE OF CORRECTION

| | |
|---|---|
| PATENT NO. | : 11,873,056 B2 |
| APPLICATION NO. | : 17/932716 |
| DATED | : January 16, 2024 |
| INVENTOR(S) | : Takeo Kumazawa |

It is certified that error appears in the above-identified patent and that said Letters Patent is hereby corrected as shown below:

In the Claims

Column 12, Line 60, "case member, a and" should read -- case member, and --

Signed and Sealed this
Fifth Day of November, 2024

Katherine Kelly Vidal
*Director of the United States Patent and Trademark Office*